United States Patent [19]

Nishiki et al.

[11] Patent Number: 5,583,905
[45] Date of Patent: Dec. 10, 1996

[54] X-RAY IMAGING APPARATUS CAPABLE OF ELIMINATING UNWANTED X-RAY IMAGE SIGNAL COMPONENTS

[75] Inventors: Masayuki Nishiki; Yoshio Taniguchi, both of Tokyo, Japan

[73] Assignee: Kabushiki Kaisha Toshiba, Kanagawa-ken, Japan

[21] Appl. No.: 195,054

[22] Filed: Feb. 14, 1994

Related U.S. Application Data

[63] Continuation of Ser. No. 795,570, Nov. 21, 1991, abandoned.

[30] Foreign Application Priority Data

Nov. 22, 1990 [JP] Japan ..................... 2-316097

[51] Int. Cl.⁶ ..................................... H05G 1/64
[52] U.S. Cl. ..................... 378/98.8; 378/98.2
[58] Field of Search ....................... 378/99, 98.8; 358/111

[56] References Cited

U.S. PATENT DOCUMENTS

| | | |
|---|---|---|
| 3,958,078 | 5/1976 | Fowler et al. . |
| 4,137,454 | 1/1979 | Brandon, Jr. . |
| 4,612,572 | 9/1986 | Komatsu et al. .......................... 378/99 |
| 4,879,734 | 11/1989 | Schreckendgust et al. ............... 378/99 |
| 4,901,337 | 2/1990 | Fujimoto .................................. 378/99 |
| 5,107,528 | 4/1992 | Asahina et al. .......................... 378/99 |

FOREIGN PATENT DOCUMENTS

| | | |
|---|---|---|
| 0121216 | 10/1984 | European Pat. Off. . |
| 0206156 | 12/1986 | European Pat. Off. . |
| 0266819 | 5/1988 | European Pat. Off. . |

*Primary Examiner*—Craig E. Church
*Attorney, Agent, or Firm*—Finnegan, Henderson, Farabow, Garrett & Dunner, L.L.P.

[57] ABSTRACT

In an X-ray imaging apparatus, unwanted electron charges caused by pulsatory X-ray trailing edges are eliminated from an X-ray image signal of a biological body under medical examination. The X-ray imaging apparatus comprises: an X-ray generator for generating a plurality of pulsatory X-ray beams; an X-ray controlling unit for supplying an X-ray projection controlling signal to the X-ray generator in order to project an X-ray pulse beam having a predetermined pulse width to a biological body under medical examination from the X-ray generator, thereby producing an X-ray image of the biological body under medical examination; an optical converter for converting the X-ray image into a corresponding optical X-ray image signal of the biological body under medical examination; an imaging unit for imaging the optical X-ray image signal derived from the optical converter to store the imaged optical X-ray image signal as electron charges therein; a driving unit for driving the imaging unit in such a manner that only electron charges produced while projecting the X-ray pulse having the predetermined pulse width to the biological body in response to the X-ray projection controlling signal, are read out as an effective X-ray image signal of the biological body under medical examination; and, a display unit for displaying thereon an effective X-ray image of the biological body under medical examination in response to the effective X-ray image signal.

12 Claims, 13 Drawing Sheets

PULSATORY X-RAY LAG "L"

T →

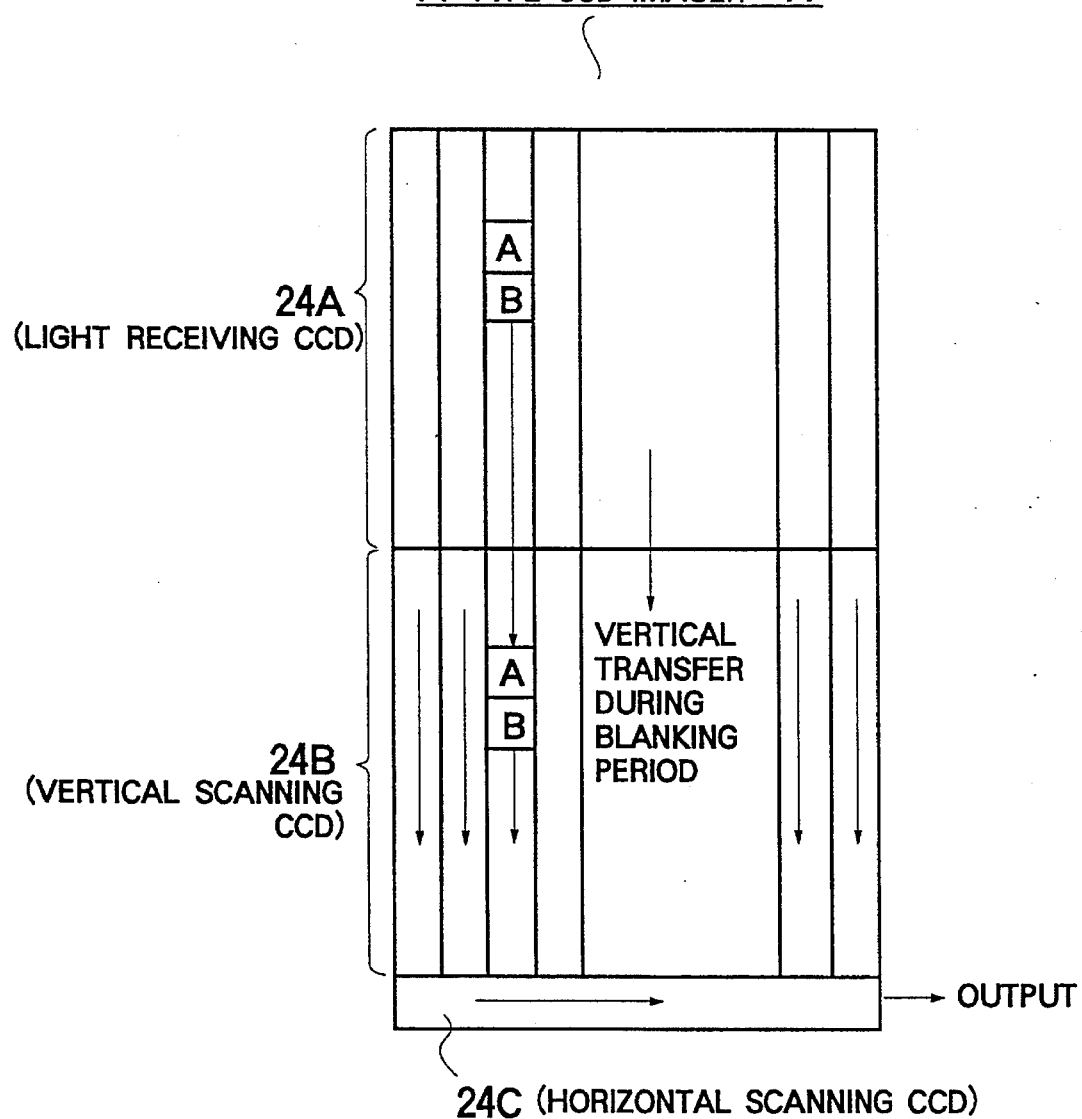

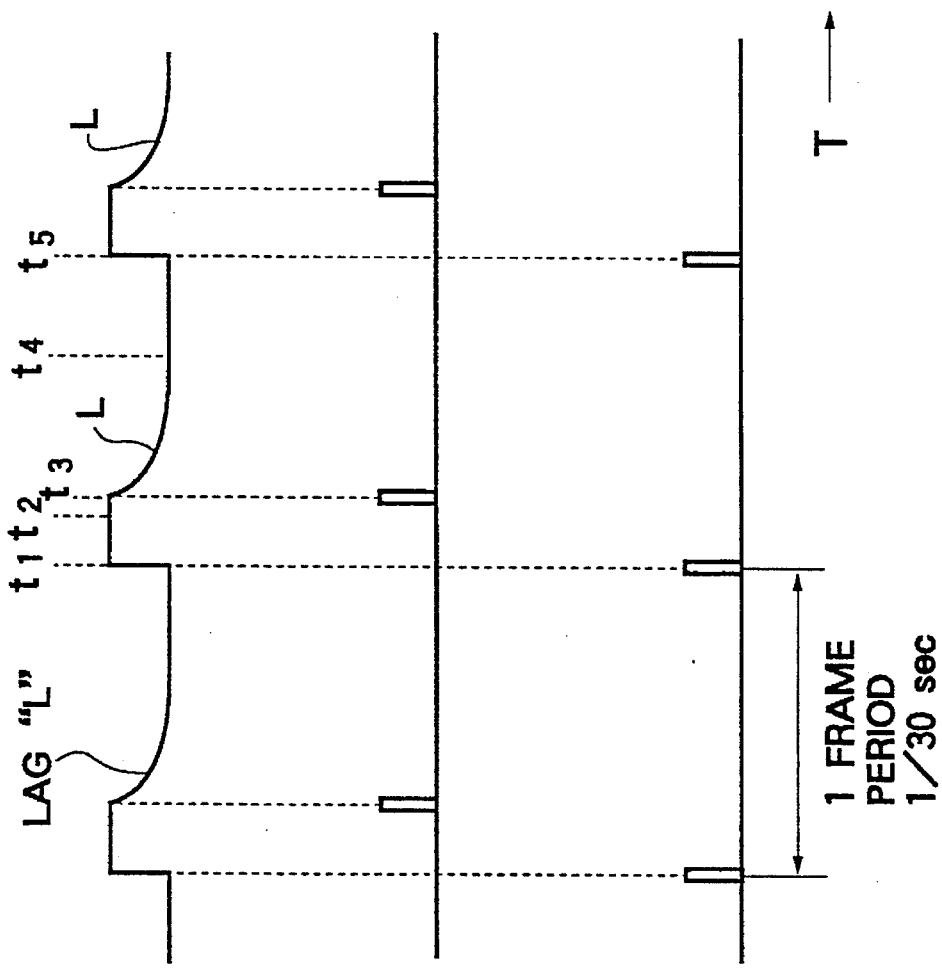

$t_1$ $t_2$
SIGNAL CHARGES $t_3$
FIELD SHIFT
SIGNAL CHARGES $t_4$
CHARGES BY DARK CURRENT
CHARGES BY LAGS
CHARGES UNDER VERTICAL TRANSFER $t_5$
Z
CHARGES SWEPT OUT

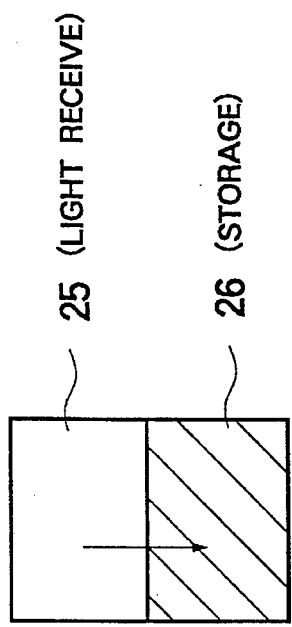
FIG.12
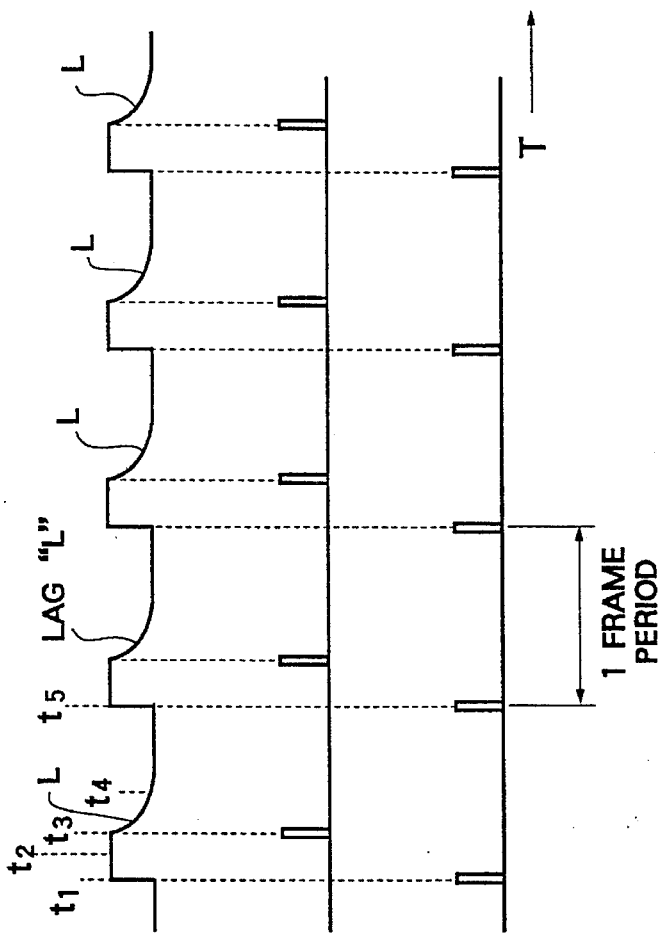
FIG.13A
FIG.13B
FIG.13C 27 (DRAIN)
25 (LIGHT RECEIVE)
26 (STORAGE)

X-RAY IMAGING APPARATUS CAPABLE OF ELIMINATING UNWANTED X-RAY IMAGE SIGNAL COMPONENTS

This application is a continuation of application Ser. No. 07/795,570 filed Nov. 21, 1991, now abandoned.

BACKGROUND OF THE INVENTION

1. Field of the Invention

The present invention generally relates to an X-ray imaging apparatus for converting pulsatory X-ray beams penetrating through a biological body under medical examination into optical X-ray images and also for converting the optical X-ray images into X-ray image signals to obtain visual X-ray images of the biological body. More specifically, the present invention is directed to such an X-ray imaging apparatus that electron charges produced only by the desirable pulsatory X-ray beams can be derived from an image sensor as effective X-ray image signals with better image qualities.

2. Description of the Prior Art

In the X-ray medical diagnostic field, such an X-ray imaging system has been utilized that X-ray beams are projected to a biological body under medical examination, and the X-ray beams which have passed through the biological body are supplied to an image intensifier so as to obtain an optical X-ray image, and thereafter this optical image is converted into an X-ray television signal to be displayed on a TV monitor. Very recently, to improve image qualities of these X-ray images, pulsatory X-ray beams are extensively utilized in these conventional X-ray imaging systems. This is because when the widths of the pulsatory X-ray beams are shortened as short as being permitted, a blurring phenomenon caused by movements of a biological body can be considerably reduced, or suppressed. A typical waveform of such a pulsatory X-ray beams is represented in FIG. 1. It should be noted that in case of low X-ray density, unwanted X-ray trailing edges, or lags "L" necessarily appear after the respective pulsatory X-ray beams having normal pulse widths (namely, ideal X-ray pulses). X-ray images produced from these unwanted trailing edges "L" have a so-termed "blurring phenomenon", resulting in deterioration of X-ray image qualities.

In FIG. 2, there is shown the arrangement of the conventional X-ray imaging system, as described in, for instance, U.S. Pat. No. 4,612,572 to KOMATSU et al. The X-ray imaging system includes an X-ray tube 1 for emitting pulsatory X-ray beams 12; a biological body 2; an image intensifier unit 3 for converting pulsatory X-ray beams 12 which have penetrated through the biological body 2 into optical image signals; an image pick-up tube, or television camera 4 for converting the optical image signals into electronic image signals; and also a television monitor (CRT) 5 for displaying X-ray images of the biological body in response to the electronic image signals. The X-ray imaging system further comprises a system controller 7 for controlling the entire circuit arrangement; an X-ray generator 8 for sending an emission control signal to the X-ray tube 1 so as to control generation of the pulsatory X-ray beams 12; an I.I. (image intensifier) blanking unit 9 for blanking the unnecessary X-ray images caused by the above-explained X-ray trailing edges "L", which will be inputted into the receiving plane of the I.I. unit 3; and a television sync signal generator 10 for supplying a television sync signal to the image pick-up tube 4.

To prevent such unnecessary X-ray images caused by the X-ray trailing edges "L" from being entered into the I.I. unit 3, there is provided the I.I. blanking unit 9 which has such a function that the electron charges produced by the X-ray trailing edges within the I.I. unit 3 are not converged onto the image focusing plane of the I.I. unit 3.

The above-described conventional X-ray imaging system has a drawback such that the I.I. blanking unit 9 is necessarily required so as to avoid the adverse influences given to the image qualities due to occurrences of the pulsatory X-ray lags "L". Accordingly, the X-ray imaging system costly becomes high and also large in size.

There is another problem in the conventional X-ray imaging system that since the response time of the I.I. blanking unit is relatively slow, e.g., 2 to 3 milliseconds, the operable maximum speed of this X-ray apparatus should be limited, or lowered.

SUMMARY OF THE INVENTION

The present invention has been made in an attempt to solve the above-described various drawbacks, and therefore has an object to provide an X-ray imaging apparatus capable of eliminating unwanted X-ray image signal components caused by the pulsatory X-ray trailing edges so as to produce only effective X-ray image signals.

A further object of the present invention is to provide an X-ray imaging apparatus from which an image intensifier blanking unit having slower response time has been omitted so as to allow higher operable speeds of the X-ray imaging apparatus.

A still further object of the present invention is to provide an X-ray imaging apparatus capable of eliminating unnecessary X-ray image signal components caused by dark current of an image sensor.

The above-described object and other features of the present invention may be achieved by providing an X-ray imaging apparatus (100) comprising:

X-ray generating means (1) for generating a plurality of pulsatory X-ray beams (12);

X-ray controlling means (8) for supplying an X-ray projection controlling signal to the X-ray generating means (1) in order to project an X-ray pulse beam having a predetermined pulse width ($t_1$–$t_2$) to a biological body (2) under medical examination from the X-ray generating means (1), thereby producing an X-ray image of the biological body (2) under medical examination;

optical converting means (3) for converting the X-ray image into a corresponding optical X-ray image signal of the biological body (2) under medical examination;

imaging means (40:42:44) for imaging the optical X-ray image signal derived from the optical converting means (3) to store the imaged optical X-ray image signal as electron charges therein;

driving means (30:50) for driving the imaging means (40:42:44) in such a manner that only electron charges produced while projecting said X-ray pulse having said predetermined pulse width ($t_1$–$t_2$) to said biological body (2) in response to said X-ray projection controlling signal, are read out as an effective X-ray image signal of the biological body (2) under medical examination; and, display means (5) for displaying thereon an effective X-ray image of the biological body (2) under medical examination in response to said effective X-ray image signal.

Furthermore, an X-ray imaging apparatus (200), according to the present invention, comprises:

first X-ray generating means (1F) for generating a plurality of first pulsatory X-ray beams (12F);

second X-ray generating means (1L) positioned along a direction different from said first X-ray generating means (1F), for generating a plurality of second pulsatory X-ray beams (12L);

X-ray controlling means (208) for supplying a first X-ray projection controlling signal to said first X-ray generating means (1F) so as to project a first X-ray pulse beam having a first predetermined pulse width ($t_1$–$t_2$) to a biological body (2) under medical examination from said first X-ray generating means (1F), thereby producing a first X-ray image of the biological body (2), and also for supplying a second X-ray projection controlling signal to said second X-ray generating means (1L) in order to project a second X-ray pulse beam having a second predetermined pulse width ($t_1$–$t_2$) which is temporally different from said first X-ray pulse beam, from said second X-ray generating means (1L), thereby producing a second X-ray image of the biological body (2);

first optical converting means (3F) for converting the first X-ray image into a corresponding first optical X-ray image signal of the biological body (2);

first imaging means (40F) for imaging the first optical X-ray image signal derived from the first optical converting means (3F) to store therein the imaged first optical X-ray image signal as first electron charges;

second optical converting means (3L) for converting the second X-ray image into a corresponding second optical X-ray image signal of the biological body (2);

second imaging means (40L) for imaging the second optical X-ray image signal derived from the second optical converting means (3L) to store therein the imaged second optical X-ray image signal as second electron charges;

driving means (250:280) for driving said first imaging means (40F) in such a manner that only third electron charges produced while projecting said first X-ray pulse beam having said first predetermined pulse width ($t_1$–$t_2$) to the biological body (2) in response to said first X-ray projection controlling signal, are read out as a first effective X-ray image signal of the biological body (2), and also for driving said second imaging means (40L) in such a way that only fourth electron charges produced while projecting said second X-ray pulse beam having said second predetermined pulse width ($t_1$–$t_2$) to the biological body (2) in response to said second X-ray projection controlling signal, are read out as a second effective X-ray image signal of the biological body (2); and, display means (5F:5L) for displaying both first and second effective X-ray images of the biological body (2) under medical examination in response to said first and second effective X-ray image signals.

BRIEF DESCRIPTION OF THE DRAWINGS

For a better understanding of the present invention, reference is made of the following detailed descriptions in conjunction with the accompanying drawings, in which:

FIG. 5B is an illustration of a basic operation of an FT type CCD imager 44;

FIGS. 6A to 6C are timing charts for explaining operation timings between the field shift pulse and the shutter pulse in response to the X-ray pulses in the first X-ray imaging apparatus 100 shown in FIG. 3;

FIGS. 10A–10D, 11A–11D, 12, 13A–13C and 14 illustrate various timing operations of other types of CCD imagers employed in the first X-ray imaging apparatus 100;

DETAILED DESCRIPTION OF THE PREFERRED EMBODIMENTS

BASIC IDEA

The present invention has been made based upon the following basic idea:

In an X-ray imaging apparatus including a sold-state imaging element or the like, electron charges produced only at a timing when X-ray pulses are projected to a biological body under medical examination, are picked up from the imaging element as imaging signals, whereas other electron charges generated at a timing when descending lags (trailing edges) of the X-ray pulses appear, are not picked up therefrom as imaging signals. As a result, adverse influences caused by the last-mentioned electron charges of the imaging element are not given to the quality of X-ray images, for instance, no blurring phenomenon and also no dark current.

OVERALL ARRANGEMENT OF FIRST X-RAY IMAGING APPARATUS

Figure 3:
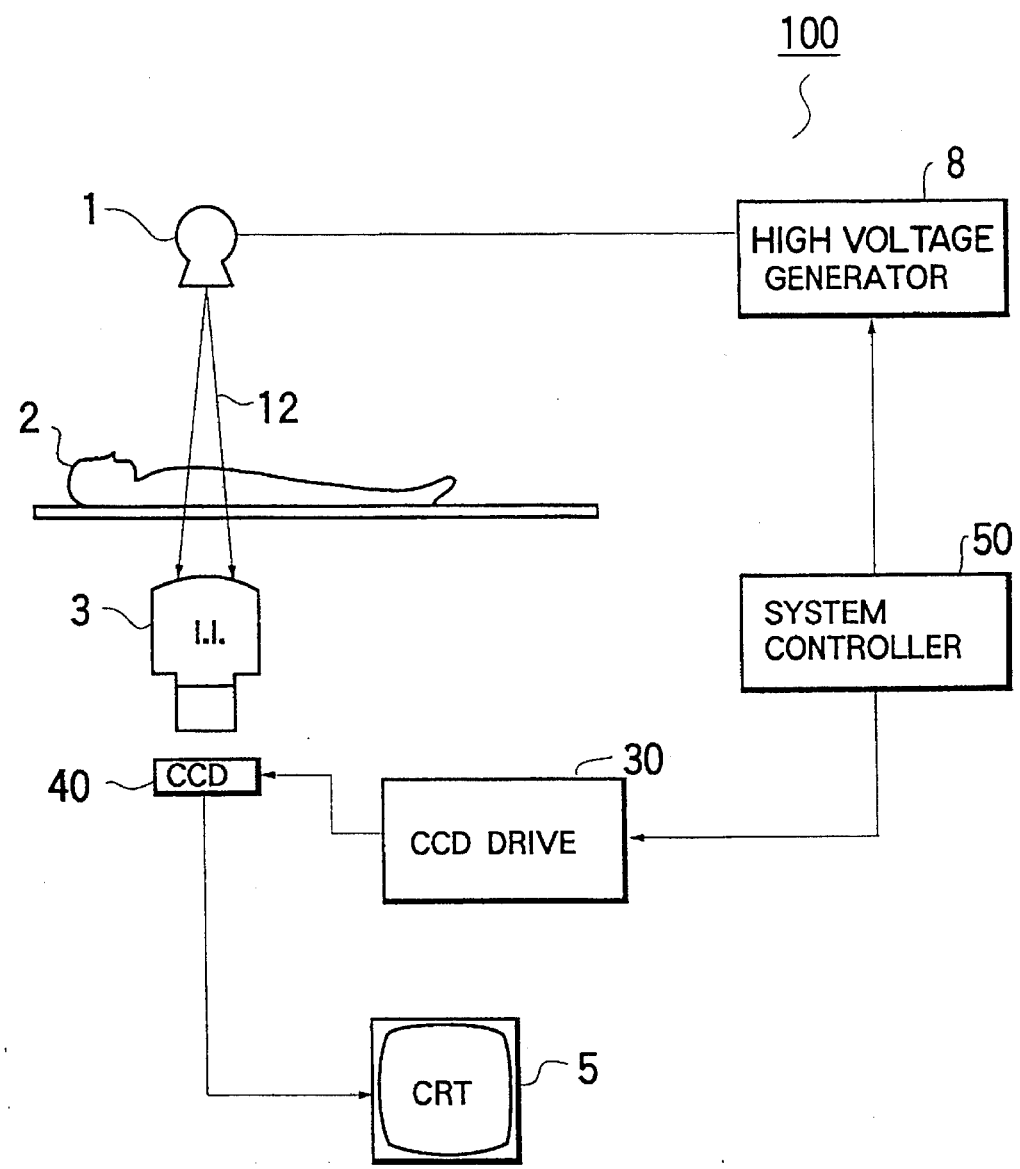
FIG. 3 is a schematic block diagram for representing an overall arrangement of an X-ray imaging apparatus 100 according to a first preferred embodiment of the present invention.

Referring now to FIG. 3, an overall arrangement of an X-ray imaging apparatus 100 according to a first preferred embodiment of the present invention will be described.

The first X-ray imaging apparatus 100 is mainly constructed of an X-ray tube 1 for emitting pulsatory X-ray beams 12 which will then penetrate through a biological body 2 under medical examination and reach an image intensifier 3; a charge-coupled device imager 40 for converting an optical image signal of the biological body 3 obtained from the image intensifier 3 into a corresponding electronic image signal; and a cathode-ray tube 5 functioning as a TV monitor which, receives a TV signal from CCD imager 40 (although not shown in detail, a television signal processor is employed to process the electronic image signal derived from the CCD imager 40, thereby producing the TV signal).

The first X-ray imaging apparatus 100 further comprises; a system controller 50 constituting a major feature of this preferred embodiment, and for controlling an overall system of this X-ray imaging apparatus 100 (will be discussed later); an high voltage generator 8 for applying a high voltage to the X-ray tube 1 so as to emit the pulsatory X-ray beams 12 therefrom: and a CCD drive signal generator 30 for generating a CCD drive signal so as to drive the CCD imager 40.

Figure 1:
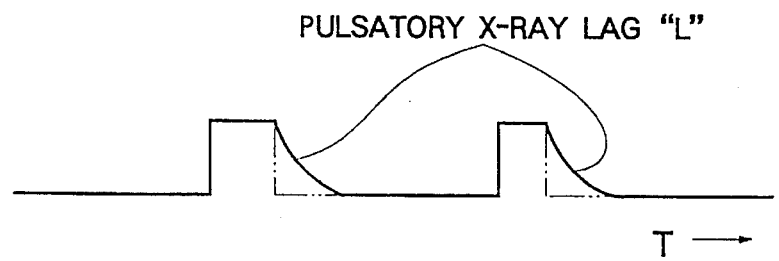
FIG. 1 represents pulsatory X-ray beams having lags "L"
Figure 2:
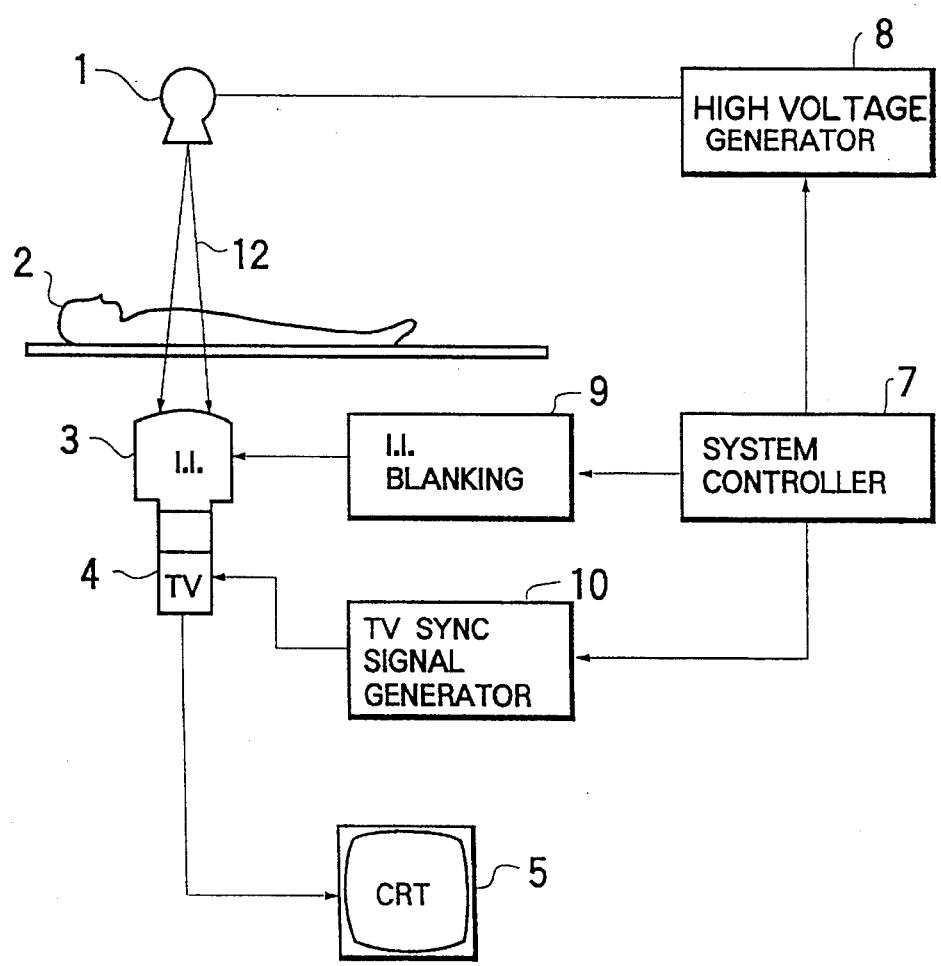
FIG. 2 is a schematic block diagram for showing the arrangement of the conventional X-ray imaging system.

As will be described later more in detail, under control of the system controller 50, the CCD drive signal generator 30 produces the CCD drive signal thereby to perform such a timing control for the CCD imager 40. That is, only electron charges occurring in the CCD imager 40 at a timing when the pulsatory X-ray beams 12 are projected via the biological body 2 to the image intensifier 3, are read out from the CCD imager 40 as the image signals of the biological body 2, and also other electron charges produced in the CCD imager 40 at least during occurrence of the pulsatory X-ray lags "L" (see FIG. 2). Furthermore, in general, the CCD imager 40 has a so-called "electronic shutter" function. That is, the above-described electron charges occurring within the CCD imager 40 due to the pulsatory X-ray lags "L" (trailing edges) can be swept out from the CCD imager 40 by utilizing such an electron shutter function. Accordingly, the electron charges occurring within the CCD imager 40 in response to the trailing edges of the pulsatory X-ray beams 12 are not outputted from the CCD imager 40 as the image signal, so that no blurring phenomenon happens to occur in the resultant X-ray images displayed on the TV monitor 5.

STRUCTURE OF CCD IMAGER

Figure 4:
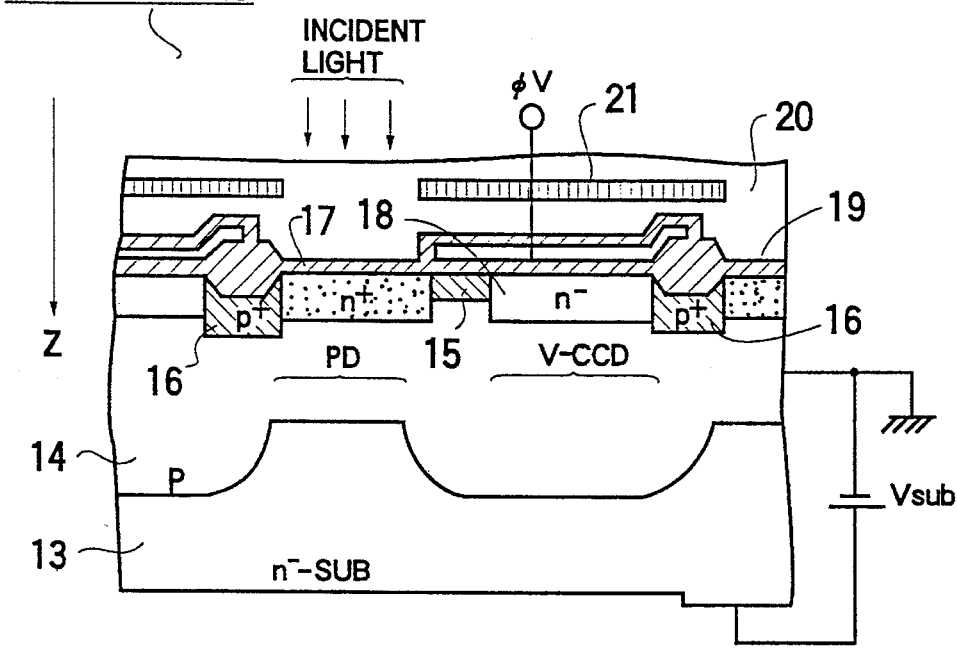
FIG. 4 is a cross-sectional view of the charge-coupled device 11 employed in the first X-ray imaging apparatus 100 shown in FIG. 1.

FIG. 4 shows a cross-sectional view of the CCD imager 40. In the major structure of this CCD imager 40 shown in FIG. 4, n⁻-substrate 13 (referred to as an "n⁻-SUB") is provided. On this substrate 13, a p-region 14, another p-region 15 and a further p⁺-region 16 functioning as a channel stopper are formed. Furthermore, an n⁺-region 17 an n⁻-region 18 are formed on the above-described p-regions. Also, a silicon oxide ($SiO_2$) film 19, an insulating film 20 and a light shield made of aluminum 21 are provided on or above the n-regions, as illustrated in FIG. 4. Symbol "PD" indicates a photodiode part of this CCD imager 40 and symbol "V-CCD" denotes a vertical CCD part thereof. This CCD imager 40 has a vertical overflow drain (VCD) structure. Accordingly, overcharges occurring in the photodiode part "PD" are not flown into the V-CCD part, but flown into the substrate 13 along a Z direction (see FIGS. 4 and 7E), by controlling the substrate voltage "$V_{sub}$". Also charges occurring in a very deep portion of the substrate 13 are similarly flown along the Z (substrate) direction and then disappear.

VARIOUS TYPES OF CCD IMAGERS

As previously explained, in accordance with the present invention, various types of charge-coupled device elements may be utilized as the CCD imager 40 of the first X-ray imaging apparatus 100. It should be noted that these charge-coupled device elements are known in the art. For instance, there are known as an IT (interline transfer) type CCD, a FT (frame transfer) type CCD, and a FIT (frame interline transfer) type CCD.

Figure 5A:
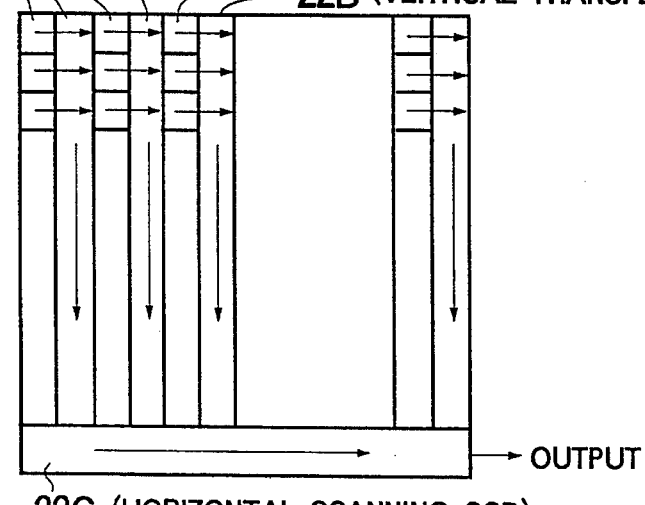
FIG. 5A is an illustration of a basic operation of an IT type CCD imager 42.

FIG. 5A pictorically explains a basic operation of an IT type CCD imager 42. As shown in FIG. 5A, vertical transfer CCD lines 22B are provided adjacent and parallel to light receiving element lines 22A. This IT type CCD imager 42 is so constructed that electron charges stored in the light receiving element lines 22A are transferred to a horizontal scanning CCD line 22C every 1 line.

FIG. 5B pictorically explains a basic operation of a FT type CCD imager 44. As represented in FIG. 5B, a light receiving CCD block 24A is provided adjacent to a vertical scanning CCD block 24B. This FT (frame transfer) type CCD imager 44 is so arranged that electron charges stored in the light receiving CCD block 24A are transferred to the vertical scanning CCD block 24B during the vertical blanking (flyback or retrace) period, and subsequently image signals are transferred from the vertical scanning CCD block 24B to a horizontal scanning CCD line 24C.

As is known in the art, a FIT (frame interline transfer) type CCD element is so constructed of combining both functions of the above-described IT type CCD element and FT type CCD element.

OVERALL OPERATION OF FIRST X-RAY IMAGING APPARATUS 100

An overall operation of the first X-ray imaging apparatus 100 will now be described with reference to not only FIG. 3, but also FIGS. 6 and 7. FIG. 6A to 6C are timing charts for the major pulse signals of the first X-ray imaging apparatus 100, and FIGS. 7A to TE pictorically explain the charge transfer operations of the CCD imager 40.

As shown in the timing chart of FIG. 6A, it is assumed that when the pulsatory X-ray beams are generated at a period of 1/30 seconds (i.e., 1 frame period), an X-ray pulse having a normal pulse width defined from a time instant "$t_1$" to a time instant "$t_2$", appears and subsequently an X-ray lag (trailing edge) "L" appears during a time period defined from a time instant "$t_3$" to a time instant "$t_4$". In this first example, both the IT type CCD imager 42 (see FIG. 5A) and the FT type CCD imager 44 (see FIG. 5B) are employed as the CCD imager 40 and the non-interlace scanning operation is carried out. It should be also noted that every pulsatory X-ray beams 12 own such a trailing edge (lag) "L".

Figure 7A:
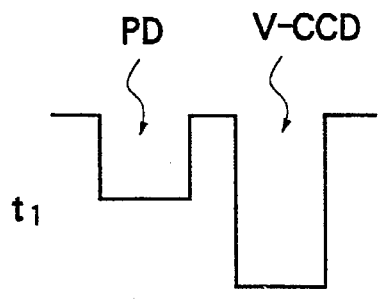
FIGS. 7A to 7E illustratively explain behavior of signal electron charges in the first X-ray imaging apparatus 100.
Figure 7B:
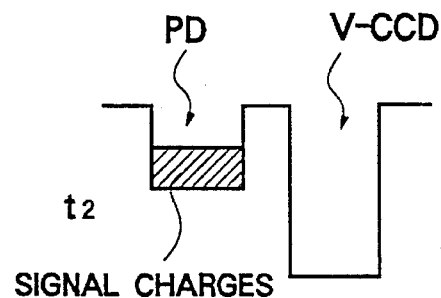

Under control of the system controller 50, when the pulsatory X-ray beams 12 are generated from the X-ray tube 1, the image intensifier tube 3 produces optical X-ray images of the biological body 2 and transfers the optical X-ray images to the CCD imager 40. More specifically, as shown in FIGS. 7A and 7B, when the X-ray pulse having the normal width is projected to the biological body 2 from a time period defined from the time instants "$t_1$" to "$t_2$", electron charges are gradually stored into the photodiode part "PD" of this CCD imager 40.

Figure 7C:
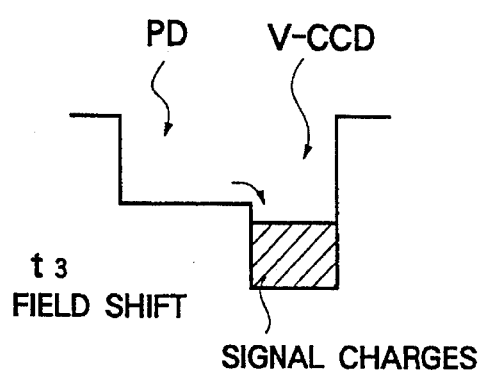
Figure 7D:
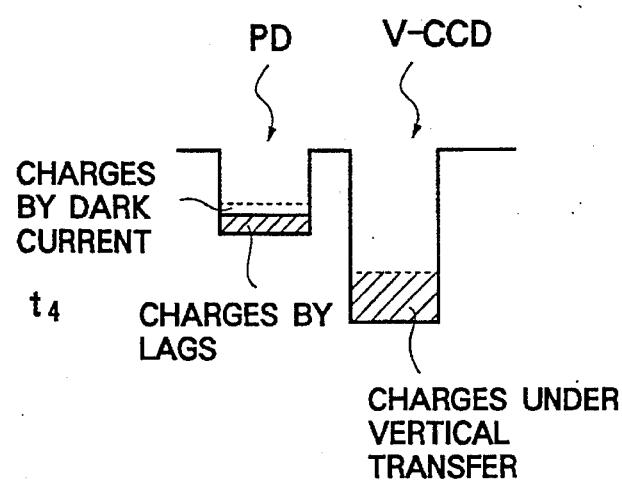

At the next time instant "$t_3$" when the pulsatory X-ray beam projection is accomplished, a field shift pulse (will be referred to as "FS") shown in FIG. 6B is produced from the CCD drive unit 30 under control of the system controller 50 and supplied therefrom to the CCD imager 40. As a result, as represented in FIG. 7C, the electron charges so far stored in the photodiode part "PD" are transferred to the vertical CCD part "V-CCD", so that these charges are read out as the effective X-ray image signals from the CCD imager 40.

Subsequently, as previously explained, when the pulsatory X-ray lag, or trailing edge "L" appears from "$t_3$" to "$t_4$", electron charges are newly, gradually stored in the photodiode part "PD" of the CCD imager 40. Furthermore, during this X-ray trailing edge period, electron charges are furthermore stored due to the dark currents of this CCD imager 40 (see FIG. 7D). These (unnecessary) electron charges stored during the X-ray trailing edge period may cause adverse influences to the X-ray image quality, e.g., blurring phenomenon.

Figure 7E:
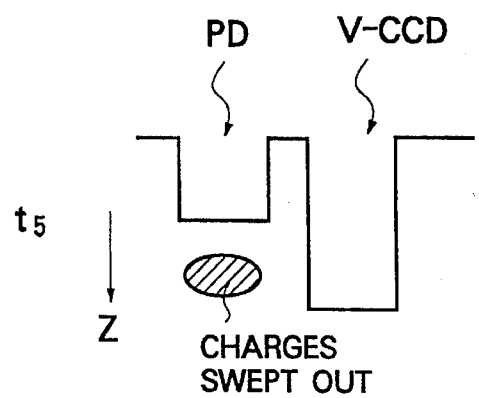

Next, at a time instant "$t_5$", namely just before the subsequent X-ray pulse is produced, the electronic shutter pulse shown in FIG. 6C is produced in the CCD drive unit 30 under control of the system controller 50 and applied therefrom the CCD imager 40. Thus, as represented in FIG. 7E, the above-described unnecessary electron charges stored in the photodiode part PD are not transferred to the V-CCD part, but are flown into the substrate 13 along the Z direction (see FIG. 4). In other words, these unwanted electron charges are not read out as the X-ray image signals from the CCD imager 40, but are swept out from this CCD imager 40. A time period defined from the first time instant "$t_1$" to the fifth time instant "$t_5$" corresponds to 1 frame period of this CCD imager 40.

Subsequently, the above-explained pulse X-ray projection and the X-ray image signal acquisition are repeated in the similar manner in the first X-ray imaging apparatus 100. As previously described in detail, since the unnecessary electron charges produced during occurrence of the X-ray lags or trailing edges "L" are not read out as the X-ray image signals, no adverse influences caused by these trailing edges "L" can be avoided while acquiring the X-ray image signals of the biological body 2 under medical examination.

INTERNAL CIRCUIT ARRANGEMENT OF SYSTEM CONTROLLER

A more detailed explanation will be made of the system controller 50 employed in the first X-ray imaging apparatus 100 shown in FIG. 3. This system controller 50 constitutes a major circuit element of the first X-ray imaging apparatus 100.

Figure 8:
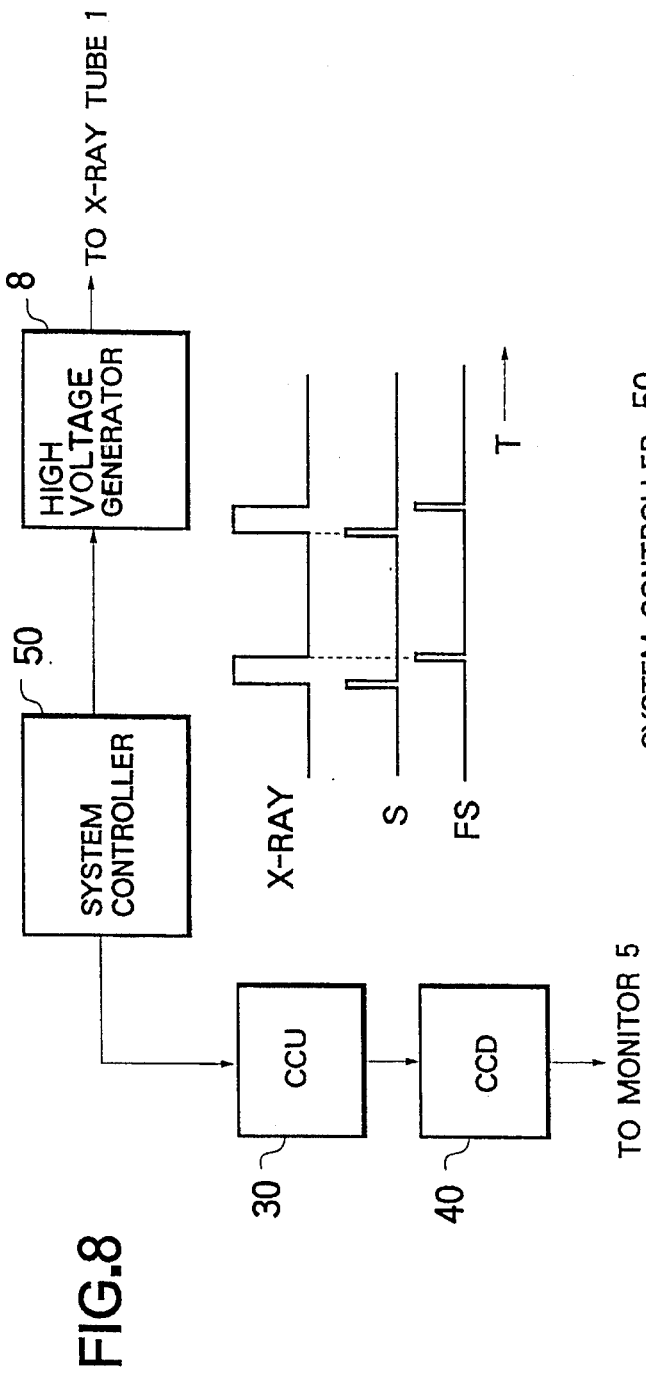
FIG. 8 is a schematic block diagram for showing more in detail, relationships among the X-ray pulses, shutter pulses and field shift pulses of the first X-ray imaging apparatus 100.

FIG. 8 shows this system controller 50 and the relevant circuit. The system controller 50 sends various control signals to a camera control unit (referred to as a "CCU" corresponding to the CCD drive unit of FIG. 3) 40, so that various CCD drive signals such as the field shift pulse "FS" and electronic shutter pulse "S" are supplied from this CCD 30 to the CCD imager 40. On the other hand, the system controller 50 transfers another control signal to the high voltage generator 8, whereby the pulsatory X-ray beams 12 are generated from the X-ray tube 1.

Figure 9:
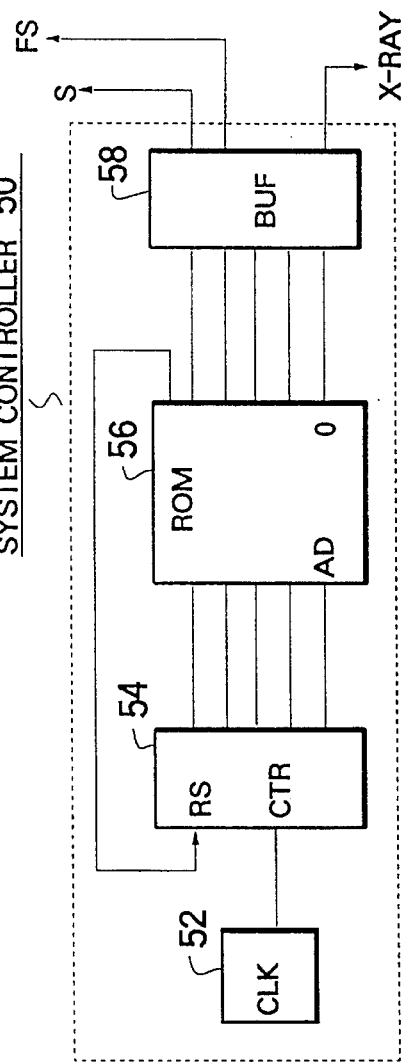
FIG. 9 is a schematic block diagram for showing an internal circuit of the system controller 50 employed in the first X-ray imaging apparatus 100.
Figure 10:
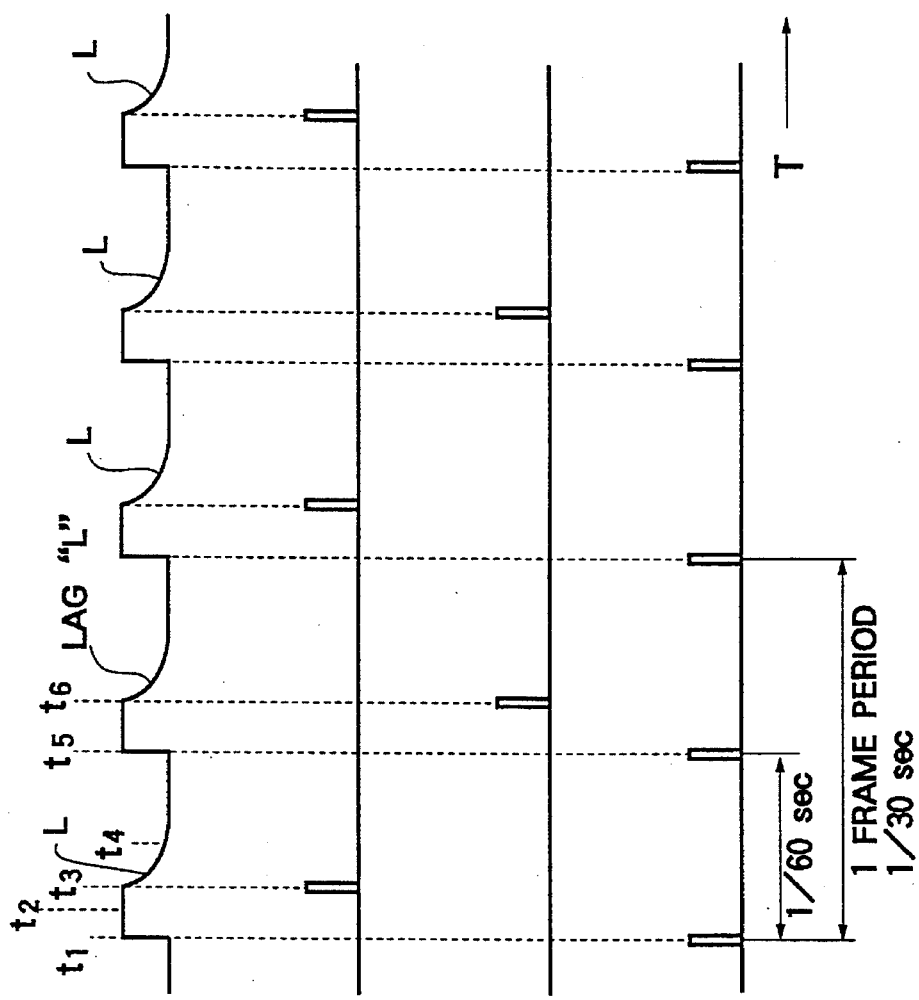

The system controller 50 is constructed of a clock generator 52, a counter 54, a ROM (read-only memory) 56 and a buffer 58, as shown in FIG. 9. The clock generator 52 generates clock pulses. These clock pulses are supplied to the counter 54. When the counter 54 counts up a preselected number, since the outputs of this counter 54 are inputted to address terminals "AD" of the ROM 56, the output "O" of this ROM 56 is supplied to the buffer 58, whereby the above-described electronic shutter pulses "S" and field shift pulse "FS" and the like are derived from the buffer 58. On the other hand, when the output "O" is produced from RDM 56, this output "O" is also furnished to a reset terminal "RS" of the counter 54 so as to reset the counted value of the counter 54. Subsequently, a series of the above-described operation is repeated so that the above-defined system controlling operation is achieved.

TIMING OPERATIONS FOR OTHER TYPES OF CCD ELEMENTS

As previously stated, any types of CCD elements may be employed as the CCD imager 40 of the first X-ray imager 100.

For instance, referring now to a timing chart of FIG. 10A–10D, the interlace scanning operation of the first X-ray imaging apparatus 100 will be described with employment of the IT type CCD imager 42 (see FIG. 5A) and FIT type CCD imager 44 (see FIG. 5B). In this second example, since the pulsatory X-ray beams 12 are produced at a period of 1/60 seconds, an odd field shift pulse (FIG. 10B) is generated at a timing "$t_3$" when, for instance, the generation of the first X-ray pulse is completed, whereas an even field shift pulse (FIG. 10C) is generated at another timing "$t_6$" when the generation of the second X-ray pulse is accomplished. Such an operation is repeated. Also, the electronic shutter pulses are produced at each of timings "$t_1$", "$t_5$",—just before the respective X-ray pulses are generated.

Under the above-explained CCD imager controlling method, i.e., the interlace scanning method, although 1 frame image is obtained by acquiring two temporally different X-ray pulses, the resultant image quality is substantially similar to that of the first example as shown in FIG. 6.

Figure 11:
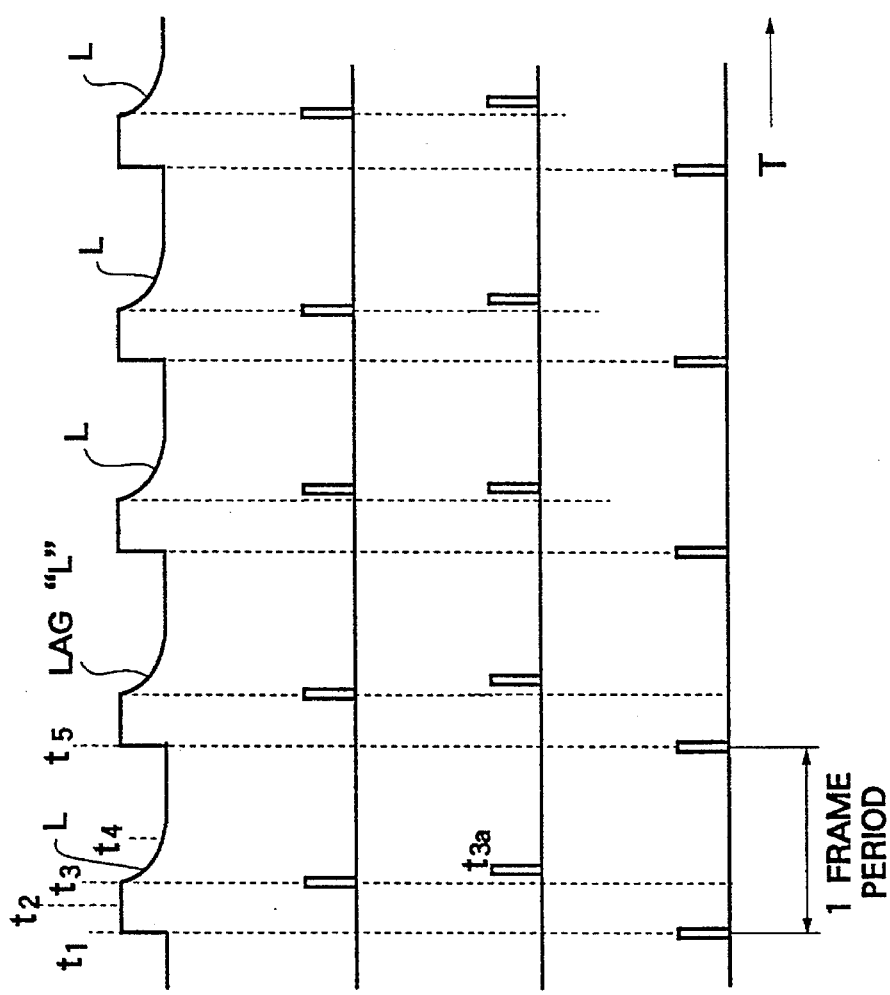

As a third example, the FIT type CCD imager 44 (see FIG. 5B) is employed as the CCD imager 40 and the first X-ray imaging apparatus 100 is operated in the interlace scanning mode, a timing chart of which is shown in FIG. 11A–11D. In this third example, for instance, an odd field shift pulse shown in FIG. 11B is produced at a timing "t3" when the generation of the first X-ray pulse shown in FIG. 11A is accomplished, and also an even field shift pulse indicated in FIG. 11C is produced at a timing "$t_{3a}$" shown in FIG. 11C. At this timing "$t_{3a}$" as shown by an arrow of FIG. 12, the odd field signal has been transferred from the light receiving section 25 to the storage section 26 in a frame transfer mode. Furthermore, electronic shutter pulses shown in FIG. 13C are generated at a timing "$t_5$" just before each of the X-ray pulses is generated.

Under this interlace scanning control operation, since both of the field signals may be synchronized with the X-ray pulses at the substantially same time phases ("$t_3$" and "$t_{3a}$"), the resultant image quality may be further improved, as compared with that of the second example. Either electronic shutter pulses as shown in FIG. 13C, or reverse-transfer pulses are produced at a timing "$t_5$" just before the respective X-ray pulses shown in FIG. 13A are generated.

Figure 14:
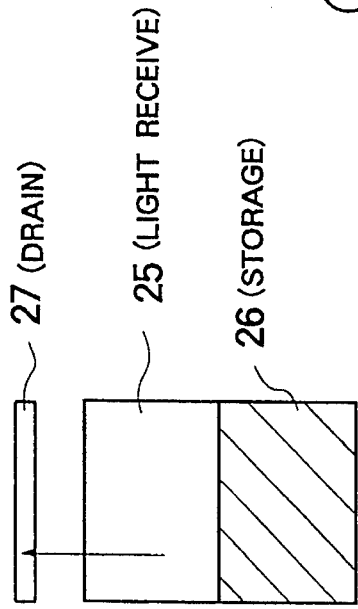

In accordance with the fourth embodiment, the unnecessary image signals or electron charges caused by the X-ray trailing edges appearing in the photodiode part PD (see FIG. 4) of the CCD imager 44 can be swept out therefrom by utilizing the electronic shutter operation. Otherwise, if the CCD imager is not equipped with such an electron shutter function, these unnecessary electron charges can be swept out therefrom by transferring these unnecessary electron charges from the light receiving section 25 to the drain section 27, as illustrated by an arrow of FIG. 14.

It should be noted that the typical response time of the conventional I.I. blanking unit is 2 to 3 milliseconds, whereas the typical response time of the CCD imager is shorter than 100 microseconds.

In a fourth example, the FT type CCD imager 44 as shown in FIG. 5B is employed as the CCD imager 40 and the first X-ray imaging apparatus 100 is operated in the non-interlace scanning mode.

As represented in a timing chart of FIG. 13, at a timing "$t_3$" when each of the desirable X-ray pulses is ended (see FIG. 13A), a frame transfer pulse as shown in FIG. 13B is produced from the CCD drive unit 30, instead of the above-described field shift pulse as shown in, for instance, FIG. 6B.

ARRANGEMENT OF SECOND X-RAY IMAGING APPARATUS 200

Figure 15:
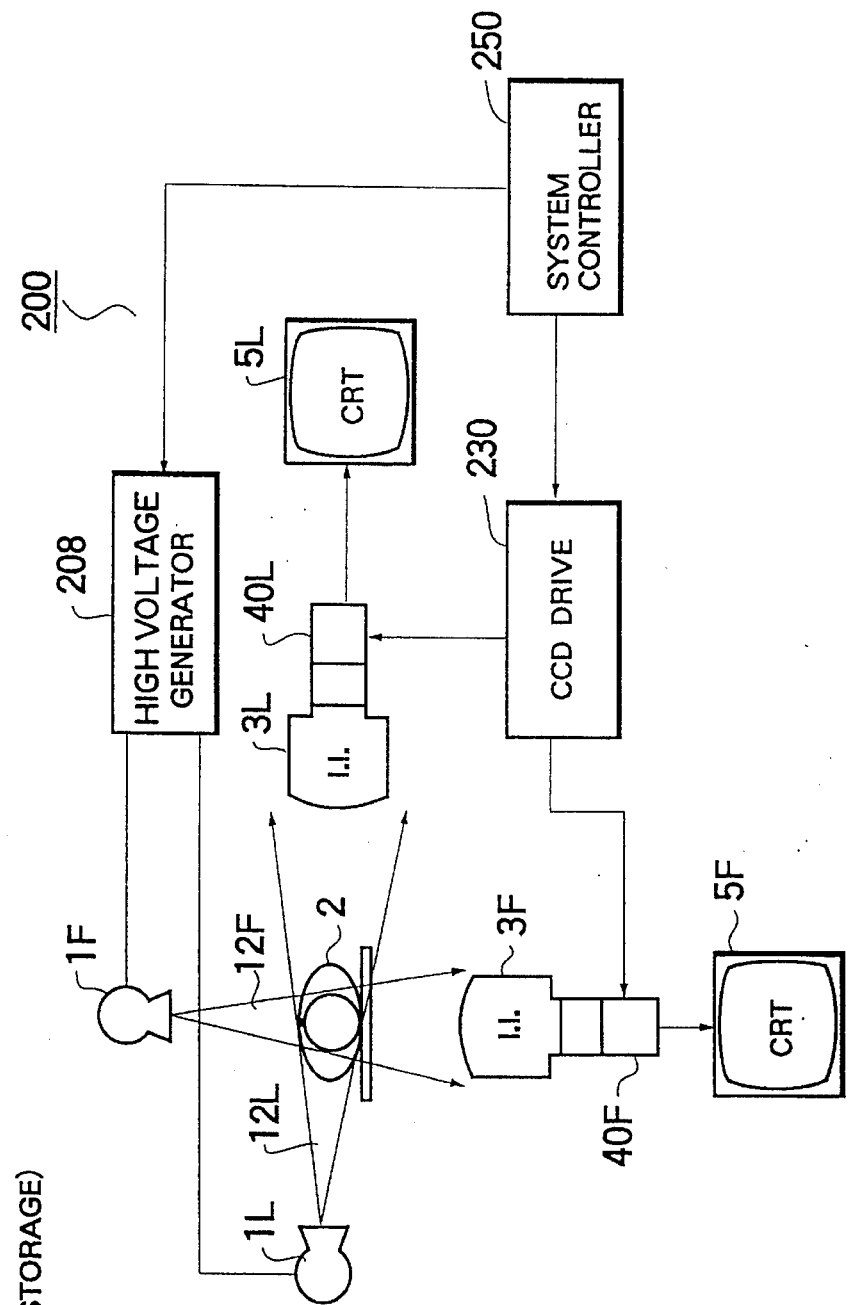
FIG. 15 is a schematic block diagram for showing an entire arrangement of an X-ray imaging system 200 according to a second preferred embodiment of the present invention.

FIG. 15 is a schematic block diagram for showing an entire arrangement of an X-ray imaging apparatus 200 according to a second preferred embodiment of the present invention. The second X-ray imaging apparatus is so called as "a pulsatory X-ray biplane system".

In the pulsatory X-ray biplane system 200, one X-ray tube 1F is provided at a frontal side of this system 200, another X-ray tube 1L is provided at a lateral side of this system 200, one image intensifier tube 3F and another image intensifier tube 3L are positioned opposite to the X-ray tubes 1F and 1L, respectively, via the biological body 2 under medical examination. Furthermore, one CCD imager 40F is employed to receive an optical X-ray image from the image intensifier tube 3F, so that an X-ray image signal at the frontal side is supplied to one TV monitor 5F. The other CCD imager 40L is similarly employed to receive another optical X-ray image from the image intensifier tube 3L, so that an X-ray image signal at the lateral side is supplied to the other TV monitor 5L. Both of the X-ray tube 1F at the frontal side and the X-ray tube 1L at the lateral side are energized by a high voltage generator 208 under control of a system controller 250. Similarly, both of the CCD imager 40F at the frontal side and the CCD imager 40L at the lateral side are energized by a CCD drive unit 230 under control of the system controller 250.

OPERATION OF SECOND X-RAY IMAGING APPARATUS

Referring now to a timing chart shown in FIG. 16, an operation of the second X-ray imaging apparatus (pulsatory X-ray biplane system) 200 will be described.

As is known in this medical field, these are adverse influences caused by the scattering X-rays in response to the pulsatory X-ray beam (12F, 12L) projections at both the frontal and lateral sides (see FIGS. 16A and 16B). For instance, as represented in FIG. 16C, undesirable signals "$S_L$" caused by the scattering X-rays in response to projections of the lateral X-ray beam 12L, appear in the output of the frontal I.I. tube 3F, although no frontal X-ray beam 12F is generated from the frontal X-ray tube 1F. To avoid such adverse influences "$S_L$", the I.I. blanking pulses as shown in FIG. 16D were required in the conventional pulsatory X-ray biplane system (not shown in detail). However, according to the present invention, only frontal field shift pulses (shown in FIG. 16E) and electronic shutter pulses (shown in FIG. 16F) are produced, whereby such as an adverse influences of the scattering X-rays caused by these unnecessary signals "$S_L$" can be completely prevented. That is to say, as shown in FIG. 16E, the frontal field shift pulses are produced from the CCD drive unit 230 under control of the system controller 250 at a timing "$t_3$" when generation of the respective frontal pulsatory X-ray beams 12F with the normal pulse widths is completed. Furthermore, the frontal electronic shutter pulses are produced as shown in FIG. 16F at a timing "$t_5$" just before the respective frontal X-ray beams 12F.

As a consequence, the adverse influences caused by receiving the lateral pulsatory X-ray beams 12L can be prevented with respect to the frontal X-ray image production.

Figure 16:
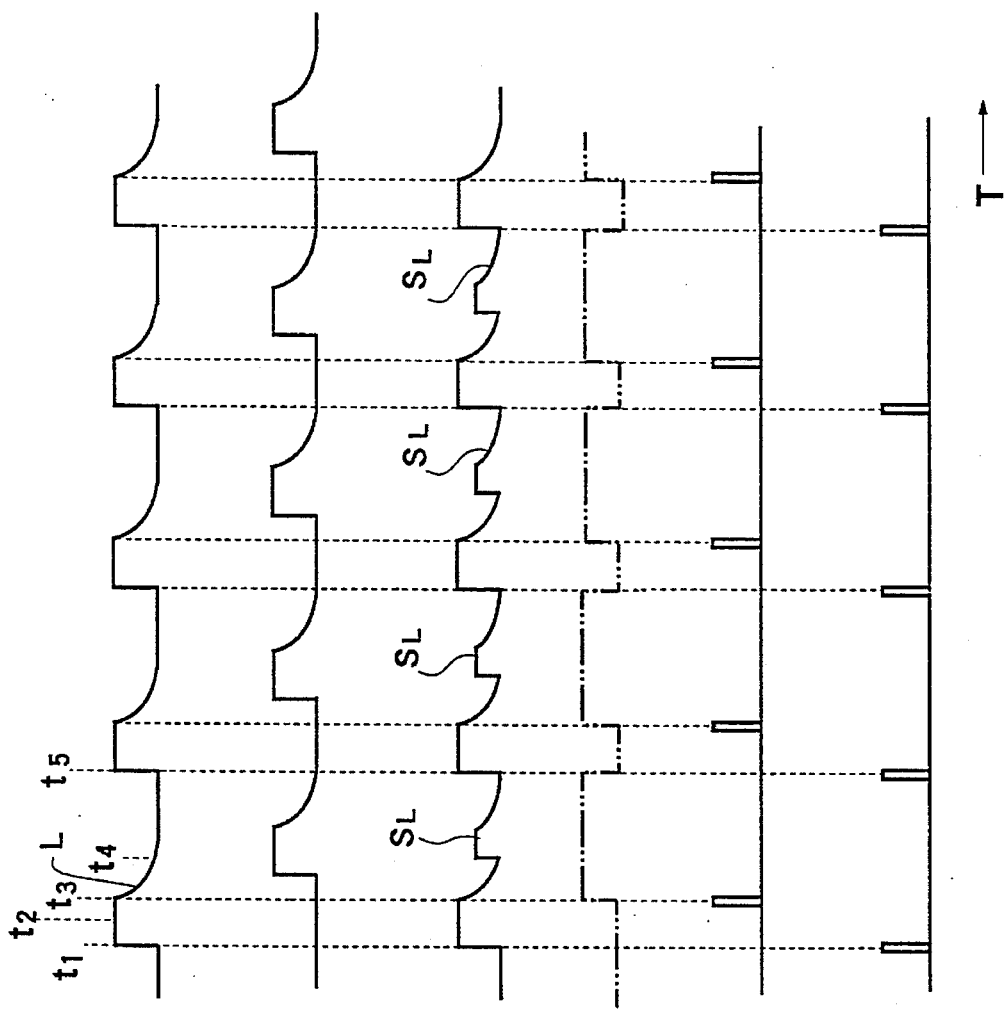
FIGS. 16A to 16F are timing charts for representing a basic operation of the second X-ray imaging apparatus 200 shown in FIG. 15.

It should be understood that although not shown in this timing chart of FIG. 16, adverse influences caused by receiving the frontal pulsatory X-ray beams 12F can be avoided in a similar manner with respect to the lateral x-ray image production.

INTERNAL CIRCUITS OF SECOND SYSTEM CONTROLLER

Figure 17:
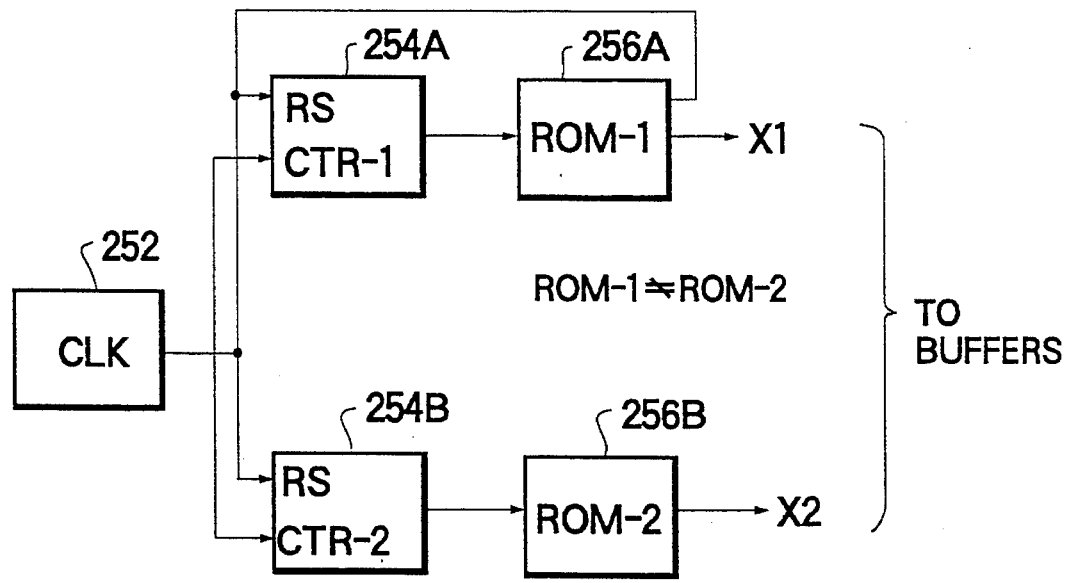
FIG. 17 is a schematic block diagram for showing a first internal circuit arrangement of the system controller 250 employed in the second X-ray imaging apparatus 200 indicated in FIG. 15, and, FIG. 18 is a schematic block diagram for showing a second internal circuit arrangement of the system controller 250 employed in the second X-ray imaging apparatus 200 represented in FIG. 15.
Figure 18:
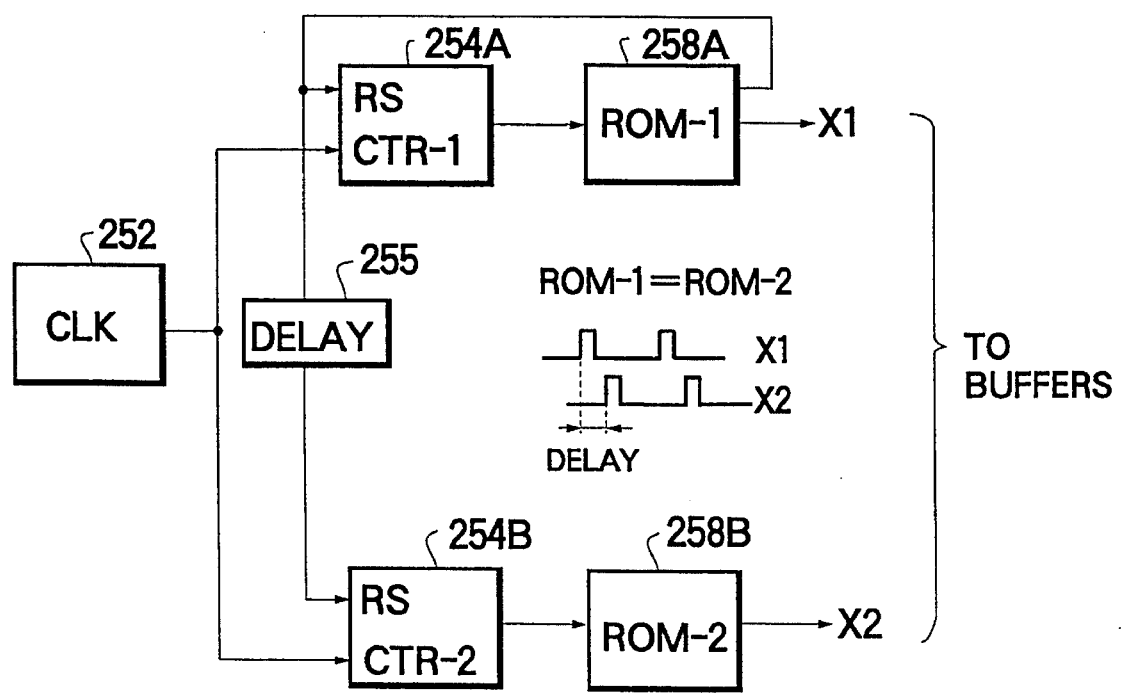

FIG. 17 shows a first internal circuit of the system controller 250 employed in the second X-ray imaging system 200, whereas FIG. 18 represents a second internal circuit of the system controller 250 employed therein.

The first internal circuit is arranged by a clock generator 252, two counters 254A, 254B and two ROMs 256A, 256B. The memory content of the first ROM 256A is not equal to that of the second ROM 256B. To the contrary, the second internal circuit employs two ROMs 258A and 258B, the memory contents of which are equal to each other, and also a delay circuit 255. The output from the first ROM 258A is supplied as a reset pulse directly to the reset terminal of the first counter 254A, and also via the delay circuit 255 to the reset terminal of the second counter 254B.

From both of the first and second internal circuits, the first X-ray control signal "$X_1$" and the second X-ray control signal "$X_2$" are produced with a predetermined delay time, as shown in FIG. 18.

As previously described in detail, in accordance with the present invention, since only the electronic charges produced by the desirable pulsatory X-ray beams can be derived as the effective X-ray image signals from the solid-state image sensor, the adverse influences caused by the pulsatory X-ray trailing edges or lags can be avoided without employing the conventional I.I. blanking unit, but by utilizing the electronic shutter function of the solid-state image sensor.

Furthermore, according to the present invention, since the conventional I.I. blanking unit having the above-explained slow response time is no longer required, no restriction is made in the operation speed of the X-ray imaging apparatus. In other words, quick movements of a biological body under medical examination can be sufficiently imaged by the X-ray imaging apparatus, according to the present invention, with keeping the better image quality.

In addition, another adverse influence caused by the dark current of the CCD imager can be avoided by way of the electronic shutter function thereof in accordance with the X-ray imaging apparatus.

What is claimed is:

1. An X-ray imaging apparatus for medical examination comprising:

a first X-ray generating means for generating pulses of X rays onto a human body, each X-ray pulse having an X-ray trailing edge;

a first image intensifier for receiving the pulses of X rays from the first X-ray generating means which pass through the human body and for converting the received X rays into a first optical image;

a second X-ray generating means for generating pulses of X rays onto a human body, each X-ray pulse having an X-ray trailing edge;

a second image intensifier for receiving the pulses of X rays from the second X-ray generating means which pass through the human body and for converting the received X rays into a second optical image;

a first CCD for receiving the first optical image and generating electron charges representing the first optical image;

a second CCD for receiving the second optical image and generating electron charges representing the second optical image;

a CCD drive unit connected to the first and second CCDs for controlling an electron charge transfer operation in the first and second CCDs;

a system controller connected to the first and second X-ray generating means for controlling the generation of the pulses of X rays from the first and second X-ray generating means and connected to the CCD drive unit in order to control the CCD drive unit to apply an electronic shutter pulse and a field shift pulse to the first and second CCD;

a first display connected to the first CCD for receiving the electron charges and providing a visual image on a screen representative of the first optical image; and a second display connected to the second CCD for receiving the electron charges and providing a visual image on a screen representative of the second optical image, wherein the system controller controls the first and second generating means to repeatedly generate pulses of X rays and controls the CCD drive unit to apply the electronic shutter pulse just before each X-ray pulse and the field shift pulse just prior to the X-ray trailing edge of each X-ray pulse.

2. An X-ray imaging apparatus as claimed in claim 1, wherein the first X-ray tube is positioned toward a frontal side of the human body and the second X-ray tube is positioned toward a lateral side of the human body, whereby the first X-ray tube is positioned at a substantially right angle with respect to the second X-ray tube.

3. An X-ray imaging apparatus as claimed in claim 1, wherein the first and second CCDs are provided with vertical overflow drains through which electron charge accumulated in the CCDs is discharged.

4. An X-ray imaging apparatus as claimed in claim 3, wherein the system controller, through the CCD drive unit, applies the electronic shutter pulse to the first and second CCDs to activate the vertical overflow drains.

5. An X-ray imaging apparatus for medical examination comprising:

X-ray generating means for generating pulses of X rays onto a human body, each X-ray pulse having an X-ray trailing edge;

an image intensifier for receiving the pulses of X rays passing through the human body and converting the X rays to an optical image;

a CCD for receiving the optical image and generating electron charges representing the optical image;

a CCD drive unit connected to the CCD for controlling electron charge transfer operation in the CCD;

a system controller connected to the X-ray generating means for controlling the generation of the pulses of X rays and connected to the CCD drive unit in order to control the CCD drive unit to apply an electronic shutter pulse and a field shift pulse to the CCD; and a display connected to the CCD for receiving the electron charges and providing a visual image on a screen, wherein the system controller controls the X-ray generating means to repeatedly generate pulses of X rays and controls the CCD drive unit to apply the electronic shutter pulse just before each X-ray pulse and the field shift pulse just prior to the X-ray trailing edge of each X-ray pulse.

6. The X-ray imaging apparatus as claimed in claim 5 wherein the CCD is provided with vertical overflow drains through which electron charge accumulated in the CCD is discharged.

7. The X-ray imaging apparatus as claimed in claim 6 wherein the system controller, through the CCD drive unit, applies the electronic shutter pulse to the CCD to activate the vertical overflow drains.

8. The X-ray imaging apparatus as claimed in claim 7, wherein the vertical overflow drains are activated by an electronic shuttering signal from the CCD drive unit.

9. An X-ray imaging apparatus as claimed in claim 5 wherein the system controller includes:

a clock generator for generating clock signals;

a counter for counting up the clock signals to output counting pulses; and a read-only memory for receiving the counting pulses and for outputting at least the field shift pulse when a number of the counting pulses reaches a preselected value.

10. The X-ray imaging apparatus in claim 5 wherein the CCD is an interline transfer type CCD.

11. The X-ray imaging apparatus in claim 5 wherein the CCD is a frame transfer type CCD.

12. The X-ray imaging apparatus in claim 5 wherein the CCD is a frame interline transfer type CCD.

* * * * *